United States Patent Office 2,927,087
Patented Mar. 1, 1960

2,927,087
METHOD OF CATALYST MANUFACTURE

Robert M. Smith, Berwyn, Ill., assignor, by mesne assignments, to Universal Oil Products Company, Chicago, Ill., a corporation of Delaware No Drawing. Application September 27, 1956
Serial No. 612,373

12 Claims. (Cl. 252—442)

This invention relates to the manufacture of catalysts and particularly to the manufacture of catalysts comprising calcined composites of a Friedel-Crafts metal halide and a refractory oxide. Another embodiment of the present invention relates to a method for the manufacture of a catalyst comprising a calcined composite of a Friedel-Crafts aluminum halide and gamma-alumina.

Friedel-Crafts metal halide containing catalysts and various methods of manufacturing the same have heretofore been suggested. These catalysts while of wide commercial applicability have been little used due to their short lives and uncontrollable high activity. The present invention is based upon the discovery that especially high activity catalysts of long useful life may be prepared by specific methods of preparation to be hereinafter described in detail.

In one embodiment, the present invention relates to a method of manufacturing a catalyst which comprises vaporizing a Friedel-Crafts metal halide onto a refractory oxide, and heating said thus formed composite at a temperature above about 300° C. for a time sufficient to remove therefrom any unreacted Friedel-Crafts metal halide.

In another embodiment, the present invention relates to a method of manufacturing a catalyst which comprises vaporizing a Friedel-Crafts metal halide onto alumina, and heating said thus formed composite at a temperature above about 300° C. for a time sufficient to remove therefrom any unreacted Friedel-Crafts metal halide.

In a more specific embodiment, the present invention relates to a method for manufacturing a catalyst which comprises vaporizing a Friedel-Crafts aluminum halide onto alumina, and heating said thus formed composite at a temperature above about 300° C. for a time sufficient to remove therefrom any unreacted Friedel-Crafts aluminum halide.

In a still more specific embodiment, the present invention relates to a method for manufacturing a catalyst which comprises subliming aluminum chloride onto alumina, and heating said thus formed composite at a temperature of from about 400° C. to about 600° C. for a time of from about 1 to about 48 hours to remove therefrom any unreacted aluminum chloride.

A still further specific embodiment of the present invention relates to a method for manufacturing a catalyst which comprises subliming aluminum chloride onto gamma-alumina, and heating said thus formed composite at a temperature of from about 400° C. to about 600° C. for a time of from about 1 to about 48 hours to remove therefrom any unreacted aluminum chloride.

As hereinbefore set forth, applicant has found that especially good catalysts are prepared in accordance with the novel features of the present invention. While the catalysts are prepared from Friedel-Crafts metal halides, they do not contain free Friedel-Crafts metal halides as prior art catalysts of this general type have contained. In the preparation of the catalysts of the present invention, the refractory oxide after vaporization thereon of a Friedel-Crafts metal halide and heating of the thus formed composite will be increased in weight by from about 2% to about 25% based on the original weight of the refractory oxide. While the exact increase in weight of the refractory oxide does not appear to be critical, it has been found that high activity catalysts are obtained when the thus treated refractory oxide has been increased in weight from about 5 to about 20%. As stated hereinabove, the present catalytic composites are prepared from a Friedel-Crafts metal halide but do not contain, after preparation, any free Friedel-Crafts metal halide. During the preparation and subsequent heating, the Friedel-Crafts metal halide appears to react with the refractory oxide. The subsequent heating treatment is then carried out at a temperature above that required for vaporization of any free Friedel-Crafts metal halide at the conditions utilized. This and other features of the present invention will be set forth hereinafter in detail.

In the first step in the preparation of the catalyst in accordance with the process of the present invention, a Friedel-Crafts metal halide is vaporized onto a refractory oxide. The amount of Friedel-Crafts metal halide utilized will range from about 5% to about 50% based on the weight of the refractory oxide, depending upon the exact manner of preparation. For example, if a batch type of vaporization method is utilized, about two times as much Friedel-Crafts metal halide per amount of refractory oxide is used as for the desired amount of weight increase in the final composite. In a continuous vaporization procedure, this amount can be lowered to one which is just slightly greater than the desired net weight increase of the final composite. It is obvious that this amount, in any case, is not critical and may be varied to arrive at the active catalyst resulting therefrom. Various Friedel-Crafts metal halides may be utilized but not necessarily with equivalent results. Examples of such Friedel-Crafts metal halides include aluminum bromide, aluminum chloride, antimony pentachloride, beryllium chloride, ferric bromide, ferric chloride, gallium trichloride, stannic bromide, stannic chloride, titanium tetrabromide, titanium tetrachloride, zinc bromide, zinc chloride, and zirconium chloride. Of these Friedel-Crafts metal halides, the Friedel-Crafts aluminum halides are preferred, and aluminum chloride is particularly preferred. This is so not only because of ease in operation in preparing the high activity catalysts in accordance with the process of this invention but also because the thus prepared catalysts have unexpectedly high activity.

In accordance with the present process, these Friedel-Crafts metal halides are vaporized onto a refractory oxide. Suitable refractory oxides include such substances as silica (a non-metallic refractory oxide), and various refractory metal oxides such as alumina, titanium dioxide, zirconium dioxide, chromia, zinc oxide, silica-alumina, silica-magnesia, silica-alumina-magnesia, chromia-alumina, alumina-boria, silica-zirconia, and various naturally occurring refractory oxides of various states of purity such as bauxite, kaolin or bentonite clay (which may or may not have been acid treated), diatomaceous earth such as kieselguhr, montmorillonite, spinels such as magnesium oxide-alumina spinels or zinc oxide spinels, etc. Of the above-mentioned refractory oxides, alumina is preferred and particularly synthetically prepared gamma-alumina of a high degree of purity.

In carrying out the present process, the temperature at which the Friedel-Crafts metal halide is vaporized onto the refractory oxide will vary in accordance with the particular Friedel-Crafts metal halide utilized. In some cases, since the Friedel-Crafts metal halide decomposes on heating to elevated temperatures, it will be necessary to carry out such vaporization at reduced pressures to preclude such decomposition. However, in most instances the vaporization is carried out either at the boiling point or sublimation point of the particular Friedel-Crafts metal halide utilized or at a temperature not greatly exceeding these points, for example, not greater than 100° C. higher than the boiling point or sublimation point of the particular Friedel-Crafts metal halide utilized. However, in some instances it may be desirable to carry out the vaporization and subsequent heating step at the same temperature and thus such temperatures are also within the generally broad scope of the present invention.

This invention can perhaps be best understood by a description of a specific embodiment thereof. As set forth hereinabove, a particularly preferred refractory oxide for use in preparing the desired catalyst is alumina. Furthermore, of the various known forms of alumina, gamma-alumina is preferred. Furthermore, the alumina preferably is prepared synthetically and is of a high degree of purity. The methods of preparation of such synthetic alumina are well known. For example, they may be prepared by the calcination of alumina gels which commonly are formed by adding a suitable reagent, such as ammonium hydroxide, ammonium carbonate, etc., to a salt of aluminum, such as aluminum chloride, aluminum sulfate, aluminum nitrate, etc., in an amount to form aluminum hydroxide which is converted to alumina by drying. It has been found that aluminum chloride generally is preferred as the aluminum salt, not only for convenience in subsequent washing and filtering procedures, but also because it appears to give the best results. Alumina gels are also prepared by the reaction of sodium aluminate with a suitable acidic reagent to cause precipitation thereof with the resultant formation of an aluminum hydroxide gel. Synthetic aluminas may also be prepared by the formation of alumina sols, for example, by reaction of metallic aluminum with hydrochloric acid, which sols can be gelled by suitable precipitation agents such as ammonium hydroxide followed by drying and calcination. In another embodiment of the present invention, synthetically prepared aluminas may contain from about 0.01% to 8% combined halogen, preferably fluorine. These halogenated aluminas may be prepared in various manners, for example, by the addition of a suitable quantity of hydrofluoric acid to an aluminum gel prior to drying and calcination thereof. In another manner, aluminum fluoride can be added to alumina gels thus yielding an alumina having the desired quantity of halogen combined therewith. When the synthetically prepared alumina is prepared from aluminum chloride, it is sometimes advantageous and/or desirable to minimize the washing thereof to control a desired amount of chlorine composited with the alumina. In any of the above instances wherein the alumina is prepared from an alumina sol or alumina gel, the resultant product is calcined to a sufficient temperature to convert the product into gamma-alumina. While the resultant aluminas may contain relatively small amounts of water of hydration, gamma-alumina with or without combined halogen is the preferred synthetically prepared alumina for use as the refractory oxide in the process of the present invention.

While the physical form of the refractory oxide is not critical, generally it is preferred to utilize macro particles so that the final composite may be used as a fixed bed in a reaction zone. Thus, it is desirable to form the synthetically prepared alumina into particles, for example, of 1/16 inch by 1/16 inch or 1/8 inch by 1/8 inch, etc. This is readily accomplished by grinding the dried alumina gel to a powder followed by pilling thereof by known methods. Alternatively the particles may be in the form of spheres, or irregularly shaped particles such as results from extrusion. While it is not intended to limit the invention to particles of any particular size, the above-mentioned alumina composites are definitely preferred.

In carrying out one embodiment of the present process, the above-described alumina has vaporized thereon aluminum chloride. This can be accomplished readily by sublimation of the aluminum chloride onto the surface of the particles. Aluminum chloride sublimes at 178° C. and thus a suitable vaporization temperature will range from about 180° to about 275° C. The sublimation can be carried out under pressure, if desired, and also in the presence of diluents such as inert gases including paraffin hydrocarbons, nitrogen, etc. The amount of aluminum chloride which sublimes onto the above-described particles reaches a maximum at any particular vaporization temperature. In addition to vaporizing and subliming onto the alumina, the aluminum chloride also reacts therewith evolving hydrogen chloride. However, it is difficult to control the amount of aluminum chloride which reacts. Therefore, to insure freedom of the resultant composite from free aluminum chloride, the composite is then heated at a temperature above about 300° C. for a sufficient time to remove therefrom any unreacted aluminum chloride. Since aluminum chloride sublimes at 178° C. this heating treatment in the absence of further aluminum chloride results in freeing the thus prepared composite from free aluminum chloride. However, since aluminum chloride itself is held onto an alumina surface, temperatures at least as high as the 300° C. indicated are required. This heating treatment can accomplish either further reaction of the unreacted aluminum chloride with the alumina, or simply sublimation of any unreacted aluminum chloride from the composite. Some hydrogen chloride evolution is noted upon vaporization of the aluminum chloride onto the alumina and during the subsequent heat treatment. This evolution is thought to be due to reaction of aluminum chloride with hydroxyl groups on the alumina surface. Thus, the first portion of the aluminum chloride vaporized onto the alumina particles may be in the form of oxy-aluminum dichloride which becomes admixed with free aluminum chloride upon further vaporization of the aluminum chloride thereon. However, regardless of whether or not this is so, the final catalyst composite is free from aluminum chloride, and it is the particular sequence of process steps which results in the unusual catalytic properties of the resultant composites. One unusual feature of catalysts which are prepared in the above-described manner is that these catalysts may be utilized for reactions for which it has heretofore been considered necessary to utilize hydrogen halide promoters along with Friedel-Crafts metal halide such as aluminum chloride. While the use of hydrogen halide promoters with the catalyst compositions of the present invention is not meant to be excluded thereby, it has usually been found unnecessary to utilize them to obtain said results with these compositions.

As set forth hereinabove, the composite of refractory oxide and Friedel-Crafts metal halide is heated at a temperature above about 300° C. for a time sufficient to remove therefrom any unreacted Friedel-Crafts metal halide. The exact temperature to be utilized will depend upon the boiling point or sublimation temperature of the particular Friedel-Crafts metal halide utilized. In general, particularly with aluminum chloride, temperatures of from about 400° C. to about 600° C. and times of from about 1 to about 48 hours are satisfactory. Furthermore, the refractory oxides utilized hereinabove are selected as substances suitable as catalyst supports for various reasons. One reason is that these substances, such as alumina, have high surface areas which appear to have beneficial effect upon catalyst activity. In many cases, these high surface areas are developed in the preparation of such supports under carefully controlled conditions of heating at specific temperatures for specific periods of time. Therefore, in the heating process step of the present invention, care must be taken so that these high surface areas are not destroyed by the evolved heat treatment. Therefore, it is usually disadvantageous to carry out such heat treatments at temperatures above about 700° C. Of course, it is obvious that such temperatures are interrelated with the time at which such refractory oxides are kept at these temperatures. Therefore, care is exerted in all instances to maintain maximum surface area during the subsequent heating of the catalyst composites in the process of the present invention.

This heating step can be carried out in the presence of various inert diluent gases. Such gases include nitrogen, oxygen, air, hydrogen, carbon dioxide, and paraffinic hydrocarbons including methane, ethane, etc. These gases do not have an adverse effect upon the resultant catalyst activity. When the vaporization step and the heating step are combined, one or more of the above gases may be utilized as the carrier gas for the Friedel-Crafts metal halide as well as providing the proper atmosphere for the heating step. The use of this technique as well as the two step method of preparation will be set forth more fully in the examples.

Furthermore, as will be demonstrated in the examples, this heating step results in catalyst composites of unexpectedly high activity for certain hydrocarbon conversion reactions. Thus, the catalysts formed in accordance with the present invention are superior to composites comprising refractory oxides and free Friedel-Crafts metal halide. Furthermore, as set forth hereinabove, the vaporizing and heating steps of the present process can be carried out as one step if desired. For example, a suitable gamma-alumina may be placed in a glass or steel tube in a furnace at the desired heating temperature and vapors of the Friedel-Crafts metal halide such as aluminum chloride passed thereover with or without the use of a suitable carrier gas.

The catalysts prepared in accordance with the present method may be utilized for effecting various reactions of organic compounds and particularly of hydrocarbons. These reactions include (A) condensation reactions in which two molecules, which may be the same or different, will condense to form larger size molecules, (B) destructive reactions in which a molecule is decomposed into a smaller size molecule or into two or more molecules, (C) rearrangement reactions as, for example, isomerization, (D) disproportionation reactions in which a radical is transferred from one molecule to another, (E) hydrogenation reactions, and (F) other reactions. Among these reactions are (1) polymerization of olefins and particularly of ethylene, propylene, 1-butene, 2-butene, isobutylene, amylenes, and higher boiling olefins and mixtures thereof, (2) alkylation of isoparaffins with olefins or other alkylating agents including, for example, alkyl halides, etc., and particularly the alkylation of isobutane, isopentane, and/or isohexane with ethylene, propylene, 1-butene, 2-butene, isobutylene, amylenes, etc., or mixtures thereof, (3) alkylation of aromatics with olefins or other alkylating agents, and particularly the alkylation of benzene, toluene, etc., with propylene, butylenes, amylenes, and particularly higher boiling olefins, including nonenes, decenes, undecenes, dodecenes, tridecenes, tetradecenes, pentadecenes, etc., or mixtures thereof, (4) isomerization of paraffins and particularly of n-butane, n-pentane, n-hexane, n-heptane, n-octane, etc., or mixtures thereof, including isomerization of less highly branched chain saturated hydrocarbons to more highly branched chain saturated hydrocarbons such as the isomerization of 2- or 3-methylpentane to 2,3- and 2,2-dimethylbutane, (5) isomerization of naphthenes, for example, the isomerization of methylcyclopentane to cyclohexane, isomerization of dimethylcyclopentane to methylcyclohexane, etc., (6) alkylation of phenols or thiophenols with olefins or other alkylating agents, (7) alkylation of thiophenes with olefins, (8) hydrogen transfer reactions, (9) alkyl transfer reactions, (10) dealkylation reactions, (11) reforming of gasolines or naphtha to improve the antiknock characteristics thereof, (12) destructive hydrogenation reactions, (13) cracking of oil heavier than gasoline into lower boiling products and particularly gasoline, including cracking under hydrogen pressure, (14) hydrogenation reactions in which an unsaturated compound is hydrogenated to a more saturated compound, for example, the hydrogenation of diolefins to olefins, olefins to paraffins, cycloolefins to naphthenes, etc., and (15) other reactions of hydrocarbons and organic compounds.

The operating conditions to be employed will depend upon the particular reaction and generally will be at relatively low temperatures although higher temperatures may be employed, particularly with atmospheric pressure. Thus, the temperature may range from 0° C. or less to 300° C. or more, preferably from 25° C. to 250° C. and the pressure may range from atmospheric to 5000 p.s.i. or more, preferably from 50 p.s.i. to about 1000 p.s.i. Hydrogen will be employed when required or of advantage. It is believed that hydrogen in controlled amounts may play an important role in suppressing sludge formation and in promoting many of the reactions discussed above.

The process may be effected in any suitable manner, which will not only depend upon the particular reaction but also upon the form in which the catalyst is used. When the catalyst is utilized as a solid mass, it may be disposed as a fixed bed in a reaction zone, and the reactants are supplied thereto in any suitable manner. Reactants may be passed either in upward flow or downflow through the catalyst bed. In another manner, the catalyst may be utilized in a so-called fluidized fixed bed type of operation in which the catalyst is maintained in a turbulent state by passage of the reactants therethrough. In another method of operation, the catalyst may be utilized as particles of suitable size so that they will be fluidized along with the reactants and passed to a reaction zone from which the catalyst is continuously separated from the reaction products. In any case, as hereinabove set forth, the catalyst may be further activated if desired by the utilization of therewith a hydrogen halide such as hydrogen chloride or hydrogen bromide. In another embodiment, the hydrogen halide may be introduced in the form of a suitable organic compound such as an alkyl halide from which the hydrogen halide is formed under the reaction conditions. Examples of such alkyl halides include propyl chlorides, butyl chloride, amyl chlorides, propyl bromides, butyl bromides, amyl bromides, etc. Also, it is within the range of the present invention to utilize the hydrogen halide promoter continuously or intermittently as may be desired in any particular case.

Regardless of the particular operation employed, the products are fractionated or otherwise separated to recover the desired products and to separate unconverted material for recycling. Hydrogen halide in the effluent product likewise is separated and may be recycled if desired. The following examples are introduced to illustrate further the novelty and utility of the present invention but with no intention of unduly limiting the same.

Example I

A gamma-alumina was prepared by the general method of dissolving aluminum pellets in hydrochloric acid to form a sol containing 15% alumina. Hydrofluoric acid was added to the sol so that the final composite contained 0.375% fluorine by weight based on dry alumina. The resulting solution was mixed with hexamethylene tetraamine in a continuous mixer and dropped into an oil bath at about 90° C. to form spheres. The spheres were aged in the oil, and then in an aqueous solution of ammonia (1–2 hours). The washed spheres were then transferred to a drier, dried at about 250° C. and calcined at about 600° C.

245.5 grams of gamma-alumina prepared as described were treated in hydrogen for 2 hours at 600° C. and then were placed in a glass liner in a rotating autoclave along with 98.2 grams of anhydrous aluminum chloride. The autoclave was sealed, pressured with 25 lbs. of hydrogen, and heated and rotated for 2 hours at 250° C. After cooling, the pressure on the autoclave was released, and upon removing the alumina it was determined that it had gained in weight equivalent to 12.5 grams per 100 grams of original alumina. Fifty cc. of the catalyst was tested for the isomerization of n-butane. The catalyst was placed as a fixed bed in a reaction tube and utilized under conditions including a pressure of 300 p.s.i.g., 0.5 hydrogen to hydrocarbon ratio, 1 LHSV, and at various temperatures. At 100° C. the amounts of isobutane in the effluent were 0.2%; at 150° C., 4.7%; at 200° C., 24.3%; and at 250° C., 48.5%. From these results it is obvious that this composition is a particularly effective isomerization catalyst. Isomerization was achieved in the absence of substantial amounts of cracking without the utilization of added hydrogen chloride.

110.3 grams of the above-prepared composite onto which aluminum chloride had been vaporized was placed in a glass tube heated by a horizontal furnace and nitrogen passed therethrough for 18 hours while maintaining the composite at 315° C. and then for two additional hours while maintaining the composite at 540° C. Upon removal from the furnace, the thus treated composite was found to have lost weight so that its total net weight gain was 6.5 grams per hundred grams of the original alumina. Thus, per hundred grams, the composite lost 6 grams. The thus treated composite was then tested for activity for the isomerization of n-butane in substantially the same manner as described hereinabove. Under the same conditions at 100° C., 12.5% isobutane appeared in the effluent; at 150° C., 38%; and at 200° C., 57%. From these results, it is obvious that the heat treatment at temperatures above 300° C. result in a catalyst composite of substantially increased isomerization activity. For example, the heat treated catalyst gives 38% isobutane in the effluent at 150° C. in comparison to 4.7% for the non-treated composite. At 200° C., the heat treated catalyst gives equilibrium quantities (57%) of isobutane in the product whereas the catalyst which had not been heat treated gave 24.3% isobutane in the product.

Further data showing the advantage of the present process is obvious from the side reactions which take place under these reaction conditions at various temperatures. From the starting temperature of 100° C. up to the temperature of 200° C., side reactions account for about 1% of the n-butane charged but at the temperature of 250° C., this amount increases up to 4% of the n-butane charged. Therefore, the obvious advantage in the higher activity catalyst is that isomerization reactions can be carried out at lower temperatures (200° C.) with higher overall yields.

The heat treated catalyst at the end of the 200° C. activity test was kept in operation for a period of 178 hours to test its stability under constant operating conditions. At 178 hours its activity had declined from 57% to about 18% isobutane in the effluent but it was still active as is shown by the fact that raising the temperature to 225° C. at the same conditions gave a conversion of 41.5% isobutane in the product. It is again emphasized that these isomerization tests were carried out without the utilization of added hydrogen chloride which has previously been considered necessary when any catalyst of the Friedel-Crafts metal halide type such as aluminum chloride is used for such reactions.

I claim as my invention:

1. A method of manufacturing a catalyst which comprises vaporizing an aluminum halide selected from the group consisting of aluminum chloride and aluminum bromide onto alumina, and subsequently heating the resultant composite at a temperature above about 300° C. for a time sufficient to remove therefrom any unreacted aluminum halide.

2. A method of manufacturing a catalyst which comprises vaporizing an aluminum halide selected from the group consisting of aluminum chloride and aluminum bromide onto alumina, and subsequently heating the resultant composite at a temperature from about 400° C. to about 600° C. for a time sufficient to remove therefrom any unreacted aluminum halide.

3. A method of manufacturing a catalyst which comprises vaporizing an aluminum halide selected from the group consisting of aluminum chloride and aluminum bromide onto alumina, and subsequently heating the resultant composite at a temperature from about 400° C. to about 600° C. for a time from about 1 to about 48 hours to remove therefrom any unreacted aluminum halide.

4. A method of manufacturing a catalyst which comprises subliming aluminum chloride onto alumina, and subsequently heating the resultant composite at a temperature above about 300° C. for a time sufficient to remove therefrom any unreacted aluminum chloride.

5. A method of manufacturing a catalyst which comprises subliming aluminum chloride onto alumina, and subsequently heating the resultant composite at a temperature from about 400° C. to about 600° C. for a time sufficient to remove therefrom any unreacted aluminum chloride.

6. A method of manufacturing a catalyst which comprises subliming aluminum chloride onto alumina, and subsequently heating the resultant composite at a temperature from about 400 C. to about 600° C. for a time from about 1 to about 48 hours to remove therefrom any unreacted aluminum chloride.

7. A method of manufacturing a catalyst which comprises vaporizing aluminum bromide onto alumina, and subsequently heating the resultant composite at a temperature above about 300° C. for a time sufficient to remove therefrom any unreacted aluminum bromide.

8. A method of manufacturing a catalyst which comprises vaporizing aluminum bromide onto alumina, and subsequently heating the resultant composite at a temperature from about 400° C. to about 600° C. for a time sufficient to remove therefrom any unreacted aluminum bromide.

9. A method of manufacturing a catalyst which comprises vaporizing aluminum bromide onto alumina, and subsequently heating the resultant composite at a temperature from about 400° C. to about 600° C. for a time from about 1 to about 48 hours to remove therefrom any unreacted aluminum bromide.

10. A method of manufacturing a catalyst which comprises subliming aluminum chloride onto gamma-alumina, and subsequently heating the resultant composite at a temperature above about 300° C. for a time sufficient to remove therefrom any unreacted aluminum chloride.

11. A method of manufacturing a catalyst which comprises subliming aluminum chloride onto gamma-alumina, and subsequently heating the resultant composite at a temperature from about 400° C. to about 600° C. for a time sufficient to remove therefrom any unreacted aluminum chloride.

12. A method of manufacturing a catalyst which comprises subliming aluminum chloride onto gamma-alumina, and subsequently heating the resultant composite at a temperature from about 400° C. to about 600° C. for a time from about 1 to about 48 hours to remove therefrom any unreacted aluminum chloride.

References Cited in the file of this patent

UNITED STATES PATENTS

| | | |
|---|---|---|
| 2,277,022 | McMillan et al. | Mar. 17, 1942 |
| 2,277,512 | Simo et al. | Mar. 24, 1942 |
| 2,311,712 | Thomas | Feb. 23, 1943 |
| 2,311,713 | Thomas et al. | Feb. 23, 1943 |
| 2,327,593 | Simo et al. | Aug. 24, 1943 |